UNITED STATES PATENT OFFICE.

JOHN COULSON, OF WILKINSBURG, PENNSYLVANIA, ASSIGNOR TO WESTINGHOUSE ELECTRIC AND MANUFACTURING COMPANY, A CORPORATION OF PENNSYLVANIA.

PREPARATION OF PLATES FOR ELECTROLYTIC CELLS.

1,330,581.  Specification of Letters Patent.  Patented Feb. 10, 1920.

No Drawing.  Application filed October 7, 1915. Serial No. 54,590.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in the Preparation of Plates for Electrolytic Cells, of which the following is a specification.

My invention relates to the preparation of metallic plates to be used as electrodes in electrolytic cells, such as lightning arresters, condensers and other forms of cells which employ metallic plates provided with asymmetric conducting films as electrodes.

The object of my invention is to prepare electrode plates of the above-indicated character which shall have very superior electrical characteristics, in comparison with the plates which have heretofore been employed for this purpose. More particularly, my invention aims to produce electrode plates that will successfully withstand high voltages and have exceedingly high capacitance.

My present process may be applied to the treatment of aluminum, tantalum, platinum, magnesium and other film-forming metals; that is to say, metals which become coated with asymmetric conducting films when subjected to electric current flow in the presence of suitable electrolytes. My process finds special utility in the treatment of aluminum plates which, as ordinarily prepared, contain small but distinctly injurious amounts of impurities, chiefly iron, manganese, copper and silica. One portion of my present process effects the removal of these traces of impurities with substantial completeness by treatment with suitable acids. Another portion of my process consists in subjecting the plates to heat treatment which, I have discovered, results in a marked improvement in the characteristics of the plates.

The following example is given by way of illustrating the steps of my process, it being understood, however, that my invention is not restricted to the precise manipulations and materials therein specified. Aluminum plates are cut to the size required in the electrolytic cells where they are to be used and are immersed in a solution of hydrofluoric acid of about 1% strength for about one minute, to effect a surface cleansing and particularly to remove any grease that may adhere to the plates. The plates are then transferred to a bath of hydrochloric acid, from 5% to 10% in strength, until the surfaces of the plates are well roughened and most of the surface glaze has disappeared, when they are again immersed for a short time in the hydrofluoric acid solution. The treatment with hydrofluoric acid and hydrochloric acid may be combined, if desired, by mixing the two acids and immersing the plates in the mixture until they are properly roughened. The plates are next placed in a 5% to 10% solution of nitric acid, where they may remain until all traces of impurities disappear from the surface. The acid treatment is completed by carefully brushing the plates to remove any adherent material and washing them thoroughly, after which the plates may be placed in a suitable film-forming electrolyte and subjected to electric current for the purpose of forming asymmetric conducting films thereon.

The acid treatment accomplishes much more than a mere surface cleansing or etching, and appears to penetrate to a considerable distance beneath the surface of the plates. In fact, in the case of thin plates, the acid appears to entirely permeate them, and to completely remove the traces of impurities which are present. This is evident since the acid treatment entirely prevents the formation of blisters which appear when untreated plates are subjected to heat, and which result from the presence of impurities in the interior of the plates. The electrical characteristics of plates pickled in the foregoing manner are found to be materially altered, their admittance being greatly increased as well as their ability to resist high voltages.

The electrodes treated in the manner described above may be provided with films and used without further treatment. I prefer, however, to subject them to a heat treatment, which consists in placing the plates in a furnace, either before or after the asymmetric films are formed thereon, and heating them to a temperature which preferably approaches the melting point of the metal under treatment. In the case of aluminum, the heat may well be raised to 500° C. or 600° C. The plates should remain in the heating furnace for two or three hours, when they should be allowed to cool and then treated to form the asymmetric films upon them or to reform such films if the plates have been treated in the film-forming electrolyte before being heated. I have found that the baking or heat treatment just described increases the break-down voltage of aluminum plates about 25%.

Plates which have been treated both by pickling and baking have an admittance many times the admittance of plates similarly prepared but without the pickling and baking treatment. One set of experiments showed that the above treatment increased the admittance of aluminum plates about six times.

The baking treatment appears to improve the plates by increasing the permanence of the electrolytic films and by preventing them from dissolving in the electrolyte in which the plates are immersed during use. Since the baking may be performed either before or after the formation of electrolytic films, it appears that the changes produced take place in the crystallographic structure of the aluminum.

The foregoing process is adapted not only for the treatment of new metallic electrodes but for renewing used and damaged electrodes which have broken down in service. The failure of aluminum electrodes of the class herein discussed results from the formation of pits or craters of aluminum oxid and aluminum hydroxid, and I find that these compounds can be cleared away by repeating the acid treatment described above, either wholly or in part. A weak mixture of nitric acid and hydrofluoric acids will quickly clean the electrodes, and render them suitable for further use after the proper films have been formed upon them.

It is to be understood that the process steps and materials which I have specifically mentioned may be variously modified without exceeding the limits of my invention, which is therefore to be restricted only by the scope of the appended claims.

I claim as my invention:

1. The process of preparing film-forming metals for use in electrolytic cells that comprises treating the metal with an acid, thereafter subjecting it to heat at a temperature approaching its melting point and cooling it.

2. The process of preparing aluminum electrodes for use in electrolytic cells that comprises successively immersing the aluminum in hydrofluoric acid, hydrochloric acid and nitric acid.

3. The process of preparing aluminum electrodes for use in electrolytic cells that comprises immersing the aluminum in a pickling bath containing hydrochloric acid, thereafter heating it to a temperature below its melting point and cooling it.

4. The process of preparing aluminum electrodes for use in electrolytic cells that comprises immersing the aluminum in a pickling bath containing hydrochloric acid, thereafter heating the aluminum to a temperature not exceeding 600° C. for several hours and cooling it.

5. The process of preparing aluminum electrodes for use in electrolytic cells that comprises immersing the aluminum successively in hydrofluoric acid, hydrochloric acid and nitric acid, cleansing the aluminum, and thereafter heating it to a temperature not exceeding 600° C. for several hours and cooling it.

6. The process of preparing film-forming metals for use in electrolytic cells which comprises immersing the metal in a solution of an acid capable of removing traces of impurities therefrom, subjecting it to heat at a temperature approaching its melting point and cooling it.

7. The process of preparing a film-forming metal for use in electrolytic cells that comprises treating the metal in an acid bath to cleanse its surface, treating it in a second acid bath to roughen its surface and then treating it in a further acid bath to remove impurities from its surface.

8. The process of preparing a film-forming metal for use in electrolytic cells that comprises treating the metal in an acid bath to cleanse and roughen its surface and further treating it in an acid bath to remove impurities.

9. The process of preparing a film-forming metal for use in electrolytic cells that comprises treating the metal with acids to cleanse and roughen its surface and remove impurities therefrom and subsequently heating the metal so treated to a point approaching its melting point.

10. The process of preparing a film-forming metal for use in electrolytic cells that comprises treating the metal to roughen its surface and to remove foreign matter and impurities therefrom and then subjecting it to heat at a temperature approaching its melting point and cooling it.

In testimony whereof I have hereunto subscribed my name this 30th day of Sept., 1915.

JOHN COULSON.